United States Patent [19]

Augustin

[11] Patent Number: 4,650,121

[45] Date of Patent: Mar. 17, 1987

[54] INJECTION NOZZLE FOR AN AIR-COMPRESSION FUEL-INJECTION INTERNAL COMBUSTION ENGINE

[75] Inventor: Ulrich Augustin, Kernen, Fed. Rep. of Germany

[73] Assignee: Daimler-Benz Aktiengesellschaft, Del.X

[21] Appl. No.: 716,553

[22] Filed: Mar. 27, 1985

[30] Foreign Application Priority Data

Mar. 28, 1984 [DE] Fed. Rep. of Germany ....... 3411331
Feb. 26, 1985 [DE] Fed. Rep. of Germany ....... 3506729

[51] Int. Cl.⁴ .......................... B05B 1/34; F02M 61/10
[52] U.S. Cl. ..................................... 239/464; 239/489; 239/533.11
[58] Field of Search .............................. 239/486–488, 239/533.3–533.12, 584, 585, 464, 489

[56] References Cited

U.S. PATENT DOCUMENTS 1,252,254  1/1918  Fisher ................................. 239/584
1,525,156  2/1925  Teufl ................................ 239/533.8
2,110,365  3/1938  Imfeld ................................ 239/584
3,802,626  4/1974  Regneault et al. ............... 239/533.5
4,365,746 12/1982  Tanasawa et al. ............. 239/533.12

FOREIGN PATENT DOCUMENTS 44636 10/1918  Sweden ............................ 239/533.3
2071762  9/1981  United Kingdom ............. 239/533.9

*Primary Examiner*—Joseph F. Peters, Jr.
*Assistant Examiner*—Michael J. Forman
*Attorney, Agent, or Firm*—Barnes & Thornburg

[57] ABSTRACT

An injection nozzle has an insert with helical swirl channels functioning as a single-jet nozzle for air-compression fuel-injection internal combustion engines, with a nozzle needle opening inwards. To achieve fuel atomization constant in terms of engine speed and load in all the operating ranges of the internal combustion engine and having a relatively invariable mushroom-like atomization form on the nozzle outlet side, the nozzle needle can be moved free of stops in the opening direction over the entire operating range, counter to the force of a spring, as a function of the fuel pressure prevailing in the pressure space, in such a way that when there is an equilibrium between the spring force and the force exerted on the needle in the pressure space, an almost always equal pressure ratio independent of the engine speed and arising in the valve-seat region is established, together with a constant outflow speed free to the combustion space.

17 Claims, 3 Drawing Figures

INJECTION NOZZLE FOR AN AIR-COMPRESSION FUEL-INJECTION INTERNAL COMBUSTION ENGINE

The invention relates to an injection nozzle for an air-compression fuel-injection internal-combustion engine with a nozzle needle which is guided in the nozzle body and lifts off from a conical valve seat in the nozzle body counter to the fuel flow direction and counter to the force of a spring and the seat surface and valve seat of which form a conical annular gap for the passage of the fuel flowing to the combustion space, and with swirl channels arranged in the nozzle body upstream of the conical valve seat, in the pressure space.

U.S. Pat. No. 4,365,746 makes known an injection nozzle as a single-jet nozzle, with a nozzle needle opening inwards and with swirl channels which are arranged in the nozzle body and through which fuel is conveyed into a swirl chamber and, only after intermediate storage, is sprayed out with a swirl via the spray hole opened by means of the nozzle needle. The nozzle is opened by electromagnetic actuating means. This publication also makes known a single-jet nozzle with swirl channels fashioned in the lower region of the nozzle needle. The swirl channels change their position with the opening stroke of the nozzle needle and connect the pressure chamber in the nozzle body to the spray hole.

In such single-jet nozzle designs with a specific nozzle opening position, the atomization of the fuel during starting, in the lower speed range and in the fuel-load range is of varying quality. At the rated power point, the atomization quality can be sufficient, but in the speed range below it there is poor atomization which results in inadequate combustion and increased combustion noises and is finally detrimental where harmful exhaust-gas constituents are concerned.

The objects of the invention is to counteract these disadvantages as regards fuel atomization and to provide an injection nozzle of simple design and functioning as a single-jet nozzle, by means of which it is possible to obtain fuel atomization constant which is in terms of engine speed and load in all the operating ranges and having an invariable mushroom-like atomization form on the nozzle outlet side.

It is a further object of the invention to provide a nozzle needle which can be moved free of stops in an opening direction over an entire operating range of an internal-combustion engine, counter to the force of a spring, as a function of fuel pressure prevailing in a pressure space, in such a way that when there is equilibrium between the spring force and the force exerted on the needle in the pressure space an almost always equal pressure ratio independent of the engine speed and arising between the inlet and outlet of an annular gap is established, together with a constant outflow speed at the annular-gap outlet free to a combustion space.

Because of the special injection nozzle with a variable passage cross-section in the valve seat, the fuel pressure is converted into fuel speed not in the spray hole opening into the combustion space, as is customary, but in the region of the valve seat. The fuel arrives there through the usual inflow line in the nozzle body and through the swirl channel which generates a swirl upstream of the valve seat of the nozzle needle. The cross-section of the nozzle with a nozzle needle which is free of stops in the opening direction, is automatically regulated in the gap, that is to say between the valve seat in the nozzle body and the nozzle-needle seat surface, so that, independently of the input pressure wave, the pressure in the pressure space remains constant as a sum pressure obtained from the input pressure wave and the reflected pressure wave. The nozzle needle therefore always only lifts off from its valve seat when the sum pressure corresponds to the opening pressure of the nozzle. The input pressure wave only determines the fuel throughput. Consequently, an at least approximately constant fuel outflow speed up to the nozzle outflow free of the spray hole or up to the combustion space, with atomization which is almost always the same, is achieved over substantially the entire operating range. A nozzle outflow free of the spray hole or a fuel passage means that the passage cross-section of the fuel passage must always be greater than the maximum annular-gap cross-section occurring at the outlet of the valve seat during full-load running of the internal combustion engine. The swirl ensures that the fuel jets leaving the valve seat do not meet and continue with an axial component, but can flow out of the nozzle without collision, in such a way that, on the nozzle outlet side, there is always approximately the same umbrella-like atomization of the fuel in the combustion space of the internal combustion engine.

It has proved advantageous, as an object of the invention, to arrange the swirl channels directly upstream of the conical valve seat.

For production reasons, the swirl channels can be formed by an insert body resting with a press fit against the cylindrical recess of the nozzle body.

The foregoing objects, features, and advantages of the present invention will become more apparent from the following description when taken in connection with the accompanying drawings which show, for the purposes of illustration only, one embodiment in accordance with the present invention, and wherein.

Figure 1:
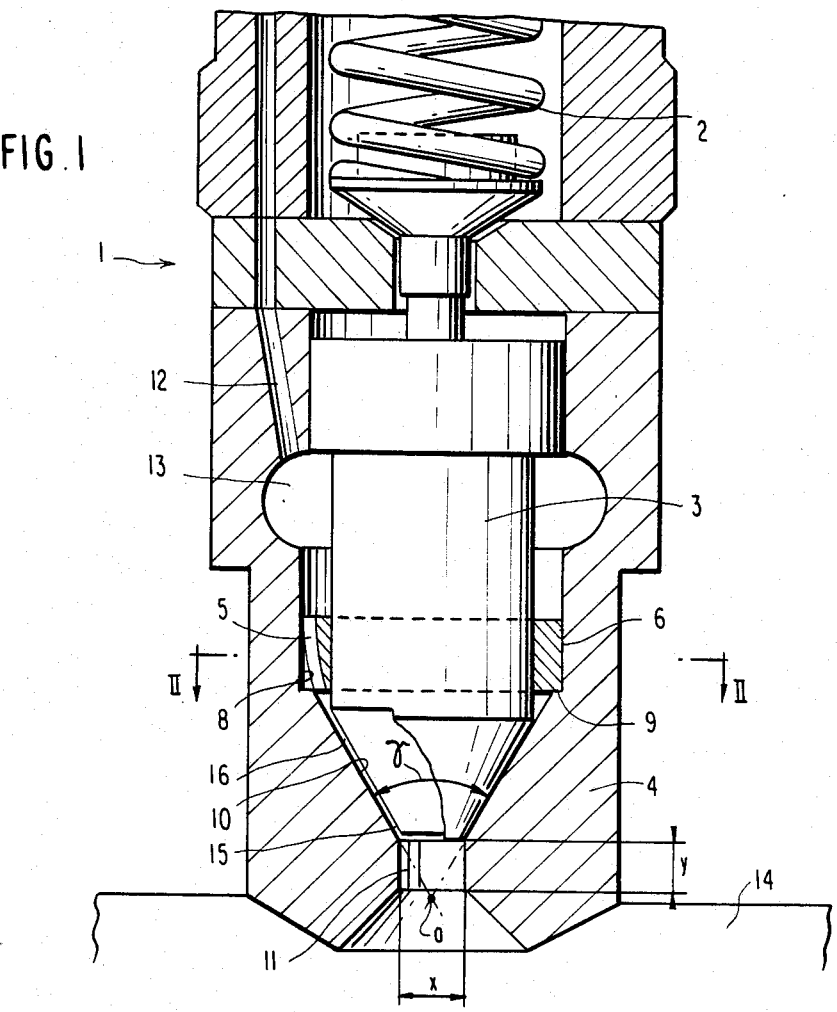
FIG. 1 shows, in section, a single-jet nozzle provided with a swirl-generating insert body, with a nozzle needle guided free of stops in the opening direction, the left half of FIG. 1 partially representing the open position of the nozzle needle and the right half its closed position.

Referring now to the drawings wherein like reference numerals are used to designate like parts and, more particularly to FIG. 1, there is shown an injection nozzle 1 designed as a single-jet nozzle and intended for air-compression direct-injection internal-combustion engines, and which is identical in terms of construction to known nozzles in the upper region.

Figure 2:
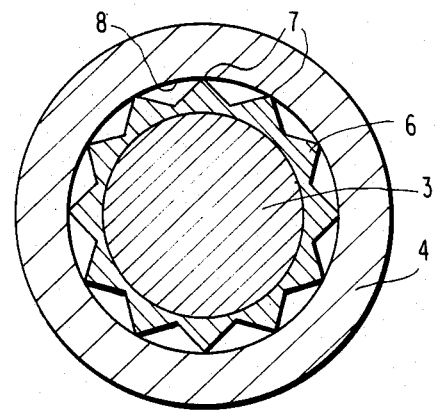
FIG. 2 shows the insert body along the line II—II in FIG. 1.
Figure 3:
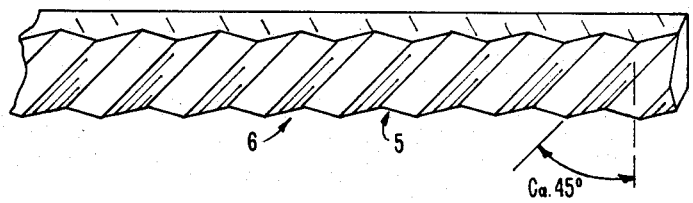
FIG. 3 shows the swirl channels in perspective bent-away condition.

In the lower region, the single-jet nozzle 1 is equipped, between the obtuse-angled nozzle needle 3 opening counter to the fuel flow direction and counter to the force of a spring 2 and the nozzle body 4, with an insert body 6 which forms helical swirl channels 5 and of which the outer channel-wall tips 7, according to FIG. 2, rest with a press fit against the cylindrical recess 8 of the nozzle body 3. The insert body 6 rests on a step 9 in the nozzle body 4 which connects the cylindrical recess 8 to a conical surface 10 which at the same time is a valve seat for the nozzle needle 3. The cone angle $\gamma$ of the valve seat 10 can be between 30° and 60°, and the diameter x of the fuel passage 11 can be between 1.6 and 1.8 mm and the passage length y between 0.5 and 1.0 mm. The cone angle $\gamma$ of the valve seat 10, the diameter x and the length of the passage 11 are coordinated with one another, according to FIG. 1, in such a way that the fuel passing via the inflow line 12 and the pressure space 13 in the nozzle body 4 and via the swirl channels 5, a swirl being generated directly in front of the valve-seat region, after leaving the seat region no longer has any wall contact in the fuel passage 11 in the nozzle body 4 opening into the combustion space 14 of the internal combustion engine.

In this single-jet nozzle 1, the passage cross section of the fuel passage 11 is always greater than the maximum annular gap cross-section which occurs at the outlet 15 of the annular gap 16 under full load. The swirl generated by the insert body 6 ensures that, at the nozzle outlet, the fuel does not, for example, meet at an imaginary point or apex "a" and then continue with an axial component, but rather flows without collision out of the fuel passage 10, bypassing the point "a", in a jet cone of approximately 20° to 40° into the combustion space.

In this single-jet nozzle 1 with a stop-free nozzle needle and a needle stroke determining the cross section or with a variable passage cross section in the valve-seat region, a constant high spraying pressure prevails independently of the particular injection rate used. It becomes possible to achieve over the entire operating range a constant atomization which, because of the swirl channels 5 in the nozzle body 4, assumes an umbrella-like form on the nozzle outlet side.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. An injection nozzle for an air-compression fuel-injection internal combustion engine, a pressure space, a nozzle needle means which is guided in a conical valve seat in a nozzle body and lifts off from the conical valve seat in the nozzle body counter to a fuel flow direction and counter to the force of a spring means biasing the nozzle needle means to a closed position, the nozzle needle means having a nozzle needle seat surface and cooperating with the conical valve seat to form a conical annular gap for the passage of the fuel flowing to a combustion space, swirl channels arranged in the nozzle body upstream of the conical valve seat and in the pressure space, a passageway means for delivering fuel to the swirl channels, the nozzle needle moveable free of stops in the fuel flow opening direction over an entire operating range of the internal combustion engine counter to the force of the spring means as a function of the fuel pressure prevailing in the pressure space, there being equilibrium between the spring force and the force exerted on the nozzle needle in the pressure space with a substantially equal pressure ratio throughout the gap independent of the engine speed and arising between the inlet and outlet of the annular gap together with a constant fuel outflow speed at a cylindrical annular-gap outlet end of the nozzle downstream of the conical gap and nozzle needle means and leading to a combustion space without contact of the fuel at the annular-gap outlet and with constant atomization.

2. An injection nozzle according to claim 1, wherein the swirl channels are provided directly upstream of the conical valve seat.

3. An injection nozzle according to claim 2, wherein the size, location and direction of the swirl channels with respect to the gap causes fuel leaving the swirl channel to flow through the gap to the cylindrical annular-gap outlet without any collision with the cylindrical annular-gap outlet to obtain identical atomization of fuel regardless of the size of the annular gap caused by movement of the nozzle body in response to the difference in the pressure of the fuel in the pressure space and the force of the spring.

4. An injection nozzle according to claim 3, wherein the cross-sectional area of the cylindrical annular-gap outlet is constant and always larger than a cross-sectional area of the gap itself, regardless of the fact that the injection nozzle may be adjusted to provide maximum fuel flow for full load operation of the internal combustion engine.

5. An injection nozzle according to claim 2, wherein the cross-sectional area of the cylindrical annular-gap outlet is constant and always larger than a cross-sectional area of the gap itself, regardless of the fact that the injection nozzle may be adjusted to provide maximum fuel flow for full load operation of the internal combustion engine.

6. An injection nozzle according to claim 1, wherein the swirl channels are formed by an insert body resting with a press fit against a cylindrical recess of the nozzle body.

7. An injection nozzle according to claim 6, wherein the cross-sectional area of the cylindrical annular-gap outlet is constant and always larger than a cross-sectional area of the gap itself, regardless of the fact that the injection nozzle may be adjusted to provide maximum fuel flow for full load operation of the internal combustion engine.

8. An injection nozzle according to claim 2, wherein the swirl channels are formed by an insert body resting with a press fit against a cylindrical recess of the nozzle body.

9. An injection nozzle according to claim 8, wherein the cross-sectional area of the cylindrical annular-gap outlet is constant and always larger than a cross-sectional area of the gap itself, regardless of the fact that the injection nozzle may be adjusted to provide maximum fuel flow for full load operation of the internal combustion engine.

10. An injection nozzle according to claim 1, wherein the location of the swirl channels is stationary in the nozzle body and thus the swirl channels are in a fixed location relationship with respect to the conical valve seat.

11. An injection nozzle according to claim 10, wherein the cross-sectional area of the cylindrical annular-gap outlet is constant and always larger than a cross-sectional area of the gap itself, regardless of the fact that the injection nozzle may be adjusted to provide maximum fuel flow for full load operation of the internal combustion engine.

12. An injection nozzle according to claim 1, wherein the size, location and direction of the swirl channels with respect to the gap causes fuel leaving the swirl channel to flow through the gap to the cylindrical annular-gap outlet without any collision with the cylindrical annular-gap outlet to obtain identical atomization of fuel regardless of the size of the annular gap caused by movement of the nozzle body in response to the difference in the pressure of the fuel in the pressure space and the force of the spring.

13. An injection nozzle according to claim 12, wherein the cross-sectional area of the cylindrical annular-gap outlet is constant and always larger than a cross-sectional area of the gap itself, regardless of the fact that the injection nozzle may be adjusted to provide maximum fuel flow for full load operation of the internal combustion engine.

14. An injection nozzle according to claim 1, wherein the cross-sectional area of the cylindrical annular-gap outlet is constant and always larger than a cross-sectional area of the gap itself, regardless of the fact that the injection nozzle may be adjusted to provide maximum fuel flow for full load operation of the internal combustion engine.

15. An injection nozzle assembly for an air-compression fuel-injection internal combustion engine comprising
a nozzle body having a conical annular valve seat,
a pressure space within the nozzle body,
a spring within the assembly,
nozzle needle means engaging the spring and lifting off the valve seat counter to pressure imposed by the spring in response to the pressure existing in the pressure space as the sum of an input pressure wave and a reflected pressure wave received from the direction of the conical valve seat for achieving from the nozzle assembly over substantially an entire operating range at least one of approximately constant outflow fuel speed and approximately constant atomization, said nozzle needle means cooperating with said nozzle body to form a cylindrical annular gap outlet, and wherein said fuel passes to a combustion space without contacting said cylindrical annular gap outlet, and further comprising
means providing swirl channels upstream of the conical valve seat.

16. An injection nozzle assembly in accordance with claim 15, wherein the nozzle body further comprises
a cylindrical recess upstream of the conical annular valve seat and
the means providing swirl channels comprising
an insert disposed as a press fit within the cylindrical recess.

17. An injection nozzle assembly in accordance with claim 15, wherein the surface of the conical annular valve seat has an imaginary apex and the means for providing swirl channels comprises
channel wall tip means disposed for generating jet cone fuel flow which substantially avoids the apex and substantially avoids collision.

* * * * *